April 11, 1967 D. J. WRIGHT ET AL 3,313,578
TRACTOR TRACK PIN BUSHINGS
Filed April 5, 1965 2 Sheets-Sheet 1

INVENTORS
DALE J. WRIGHT
DAVID S. GOULD
BY
Fryer, Tjensvold, Feix & Phillips
ATTORNEYS even # United States Patent Office 3,313,578
Patented Apr. 11, 1967

3,313,578
TRACTOR TRACK PIN BUSHINGS
Dale J. Wright and David S. Gould, Peoria, Ill., assignors to Caterpillar Tractor Co., Peoria, Calif., a corporation of California
Filed Apr. 5, 1965, Ser. No. 445,453
1 Claim. (Cl. 305—57)

This invention relates to the tracks of track-type vehicles and particularly to means for prolonging the useful life of track components in the present case, more specifically the track pin bushings.

Commonly used track chains are made up of spaced pairs of links articulately connected by track pins and by track pin bushings. The bushings of an endless chain are engaged by the teeth of a rotating sprocket to be driven forwardly and over an idler to lie on the ground where the links form a track over which the tractor moves on its track rollers.

All track parts are subject to a high rate of wear because of the service they perform and the environment in which they operate. Recent developments in seals and lubrication methods promise to increase the life of some track parts measurably and it appears that the track pin bushing in its present form will continue to be the first element of the track to fail.

Bushing failure results from wear, several causes of which will be discussed in the ensuing specification but the wear is more or less concentrated on one side of the bushing. It has been recommended practice to reverse the bushing after a measured extent of wear and to discard it when the second side becomes worn.

It is the object of the present invention to provide a track bushing which will endure longer service than the presently known bushings by increasing the thickness of the bushing at the area of greatest wear by maintaining an over-all configuration which preserves perfect performance between the bushings and sopcket as will be more fully explained in the ensuing specification by reference to the accompanying drawings.

Figure 1:
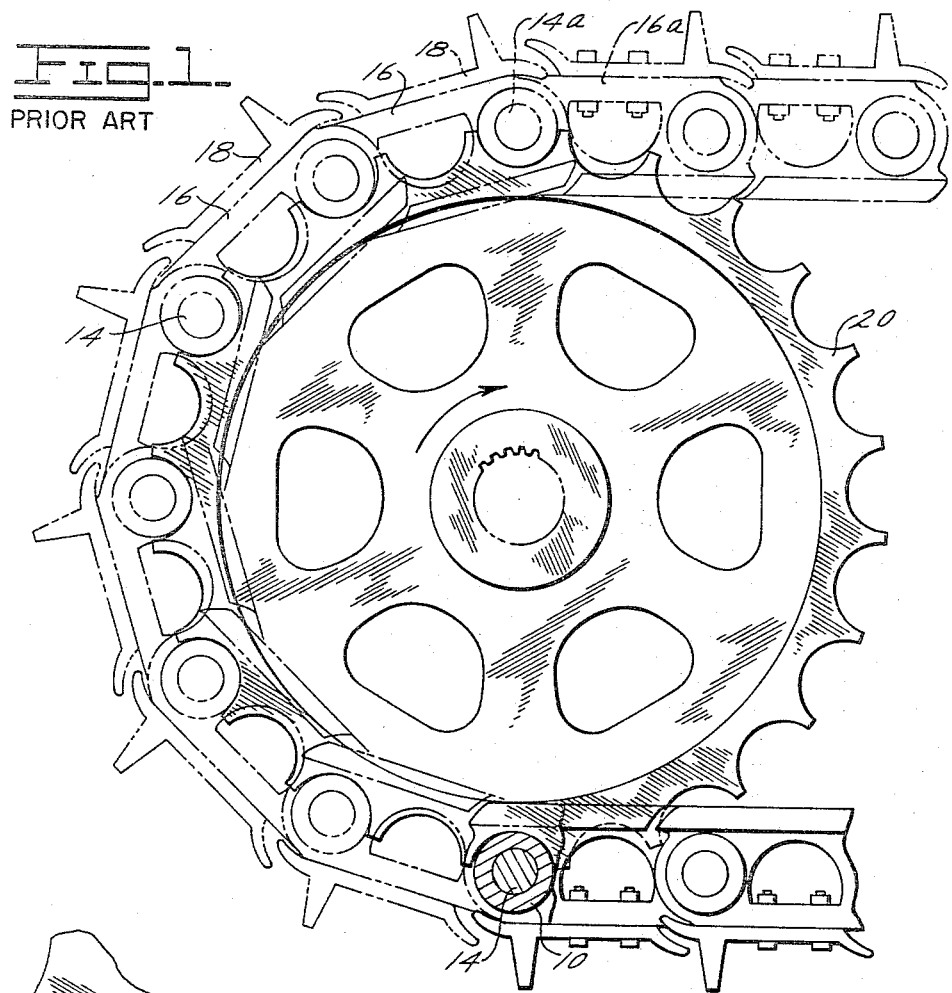
FIG. 1 is a view in side elevation of a tractor sprocket with a portion of endless track trained thereover.
Figure 2:
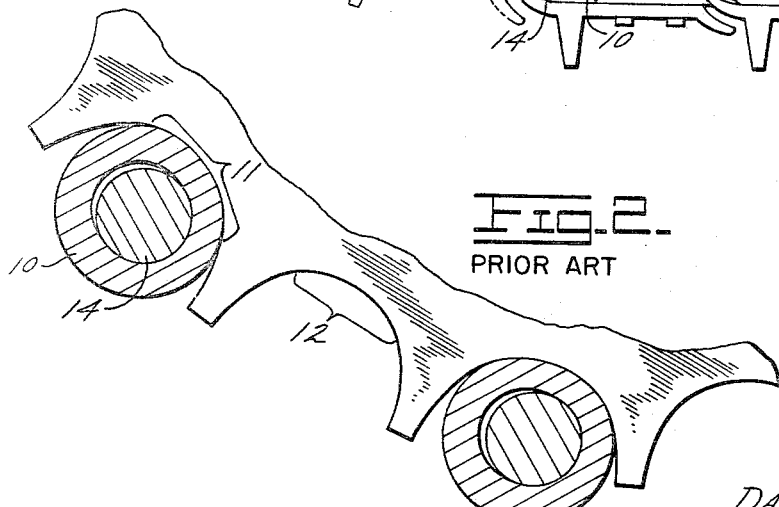
FIG. 2 is a fragmentary enlarged view of a portion of a sprocket showing two sets of track pins and bushings in operating position therein and illustrating typical wear.

The rotation of the sprocket shown in FIG. 1 is in the direction of the arrow thereon and there are several causes of wear of the track pin bushing on one side, principally where it comes into contact with the root of the sprocket. A typical prior art pin and bushing is illustrated in two places in FIG. 2 wherein the bushing shown at 10 is illustrated worn in the area of 11 where it comes into contact with the root portion 12 of the sprocket teeth. The track pin shown at 14 has also become worn on the side which faces the sprocket and, as before mentioned, it is normal practice that both the pin and bushing be reversed to present their unworn portions to the sprocket to extend their useful life. Among the causes of wear occurring at this particular side of the track pin bushing is the effective rolling of the bushing as the track leaves the sprocket at its upper side. Referring to FIG. 1 where track links 16 are illustrated as carrying track plates 18 and as connected by bushings and pins 10 and 14 it can be seen that the link just leaving the top of the sprocket which is shown at 20 has moved from an angularly related position with the adjacent link on the sprocket to a position of straight relationship with adjacent links which it assumes in the top flight of the endless chain. Consequently, as this link designated in FIG. 1 as 16a swings toward its new position the track pin bushing which surrounds the pin 14a rotates with respect to the root of the sprocket tooth grinding or wearing away the bushing on that side. Wear is also caused at this point by the build-up of foreign material such as crushed rock or sand between the sprocket and bushing which produces an abrading effect.

Figure 3:
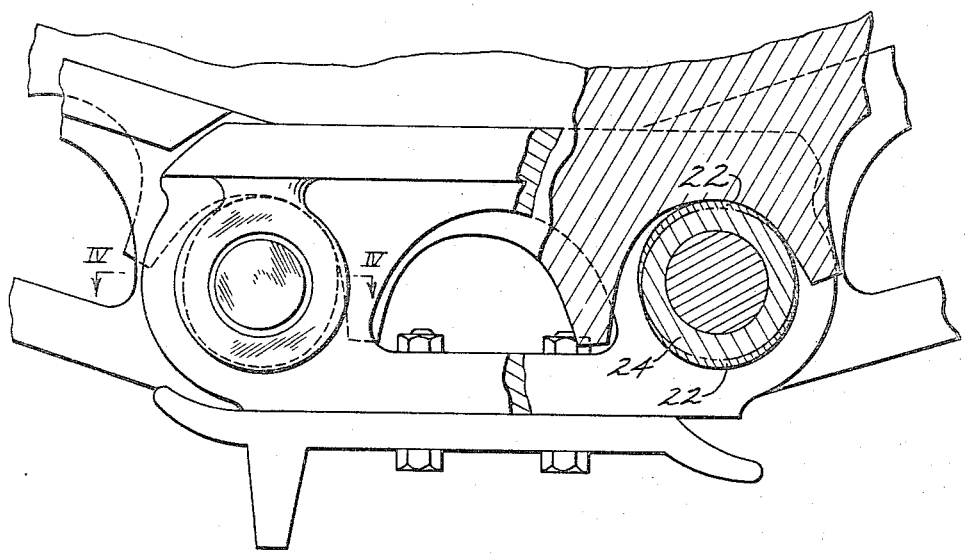
FIG. 3 is an enlarged fragmentary view of a portion of a sprocket and track parts with parts in section and illustrating the track pin bushing of the present invention.

FIG. 3 shows a bushing constructed in accordance with the present invention and the external surface of which is oval rather than cylindrical; the difference in shape between the bushing of this invention and that of the prior art being shown by the heavy hatched parts 22 of the bushing which is illustrated at 24. Since the addition of material to the side of the bushing which contacts the root of the tooth is made without increasing the width of the bushing at a 90 degree angle to the side, the bushing continues to perform properly without altering the tooth design and its life is extended by the addition of material where greatest wear is expected. The bushing illustrated is symmetric so that it may be reversed after a predetermined amount of wear has occurred in the manner previously practiced. However, a non-symmetric bushing may be used if reversing of bushings is not practiced. It is expected, because of recent developments in seals and lubrication, that excessive wear will no longer take place between the interior of the bushing and track pin.

Figure 4:
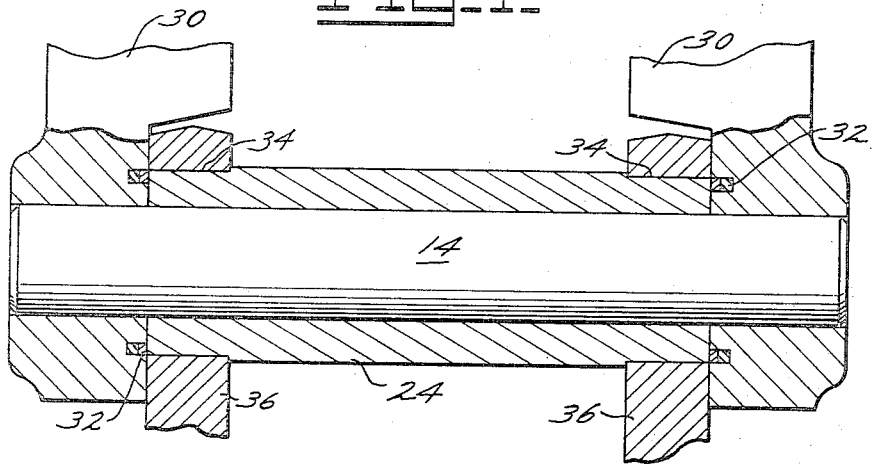
FIG. 4 is a sectional view taken on the line IV—IV of FIG. 3.

It has been common practice with most manufacturers to recess the outer bosses of the track links which are shown at 30 in FIG. 4, permitting the bushing to extend into the recesses and provide a seal at the ends of the bushings in the present case. However, bushings are preferably terminated flush with the inner face of the link which receives them and small seals are used as indicated at 32. FIG. 4 also illustrates the oval bushing 24 as having been machined to circular configuration adjacent its opposite ends so that it may be pre-seated as at 34 into a bored hole in each of the inner track links shown at 36.

The development of machinery capable of efficiently extruding irregular shaped articles makes it economically feasible to adopt for the first time such oval track pin bushings to extend the external wear life of these members.

We claim:

In a tractor track including pairs of track links articulately connected by track pins and pairs of links having bushings removably connected thereto, said bushings being arranged for engagement between teeth of a track driving sprocket, the improvement which comprises, a thick area on diametrically opposed wall portions of said bushing and a relative thin area on the diametrically opposed wall portions lying normal to the first wall portions wherein the bushing is oval, in cross-sectional throughout the tooth engaging portion thereof with the long diameter thereof lying in a plane extending transversely of said track, whereby the life of the bushing is extended since the walls thereof are thickened where the greatest wear is expected.

(References on following page)

References Cited by the Examiner

UNITED STATES PATENTS

| | | | |
|---|---|---|---|
| 1,193,550 | 8/1916 | Hovland | 305—59 X |
| 1,358,494 | 11/1920 | Arndt | 305—59 X |
| 2,340,873 | 2/1944 | Fulke | 74—251 |
| 2,411,214 | 11/1949 | Keech | 74—241 X |
| 2,970,866 | 2/1961 | Horste | 305—11 |

BENJAMIN HERSH, *Primary Examiner.*

R. J. JOHNSON, *Assistant Examiner.*